US012622524B2

(12) United States Patent
Chen et al.

(10) Patent No.: US 12,622,524 B2
(45) Date of Patent: May 12, 2026

(54) SEAT APPARATUS HAVING SIMULATED FORCE FEEDBACK AND METHOD FOR SIMULATING FORCE SENSATION OF DRIVING

(71) Applicant: NATIONAL TAIWAN UNIVERSITY, Taipei City (TW)

(72) Inventors: Shiang-Fong Chen, Taipei City (TW); Bo-Ting Lin, Taipei City (TW); Chi Pan, New Taipei City (TW); Tzu-Yuan Yu, Taipei City (TW)

(73) Assignee: NATIONAL TAIWAN UNIVERSITY, Taipei City (TW)

( * ) Notice: Subject to any disclaimer, the term of this patent is extended or adjusted under 35 U.S.C. 154(b) by 426 days.

(21) Appl. No.: 18/314,148

(22) Filed: May 9, 2023

(65) Prior Publication Data

US 2023/0371696 A1     Nov. 23, 2023

Related U.S. Application Data

(60) Provisional application No. 63/343,512, filed on May 18, 2022.

(51) Int. Cl.
*G09B 9/04* (2006.01)
*A47C 1/023* (2006.01)
(Continued)

(52) U.S. Cl.
CPC .............. *A47C 7/144* (2018.08); *A47C 1/023* (2013.01); *A47C 7/563* (2013.01); *A63F 13/803* (2014.09); *A63G 31/16* (2013.01); *G09B 9/04* (2013.01)

(58) Field of Classification Search
CPC .... G09B 9/02; G09B 9/04; G09B 9/14; A47C 7/144; A47C 7/563; A63G 31/16; A63F 13/803
See application file for complete search history.

(56) References Cited

U.S. PATENT DOCUMENTS 5,022,708 A *  6/1991 Nordella .................. G09B 9/14
                                                              248/398
5,513,990 A *  5/1996 Gluck ..................... A63G 31/16
                                                              472/60
(Continued)

FOREIGN PATENT DOCUMENTS

CN          101842822 B    10/2012
TW             I639148 B    10/2018
WO     WO2015177425 A1    11/2015

*Primary Examiner* — Omkar A Deodhar
(74) *Attorney, Agent, or Firm* — Li & Cai Intellectual Property Office

(57) ABSTRACT

A seat apparatus having a simulated force feedback and a method for simulating a force sensation of driving are provided. The seat apparatus includes a seating unit, a rotary platform, and a realistic seat pallet. The seating unit includes a seat pan. The rotary platform includes a chassis and a rotary motive module. The seat pan is disposed on the chassis along a rotation axis in an inclinable manner. The rotary motive module can control the seat pan to have a forward or rearward inclined angle. The realistic seat pallet is disposed on the seat pan, and includes a movable contact cushion and a pallet motive module. Through the pallet motive module, the movable contact cushion is slidable relative to the seat pan. The pallet motive module can control the movable contact cushion to have left and right displacements, front and rear displacements, angular displacements, or yaw rotations.

18 Claims, 12 Drawing Sheets

(51) Int. Cl.

| | | |
|---|---|---|
| *A47C 7/14* | (2006.01) | |
| *A47C 7/56* | (2006.01) | |
| *A63F 13/803* | (2014.01) | |
| *A63G 31/16* | (2006.01) | |

(56) References Cited

U.S. PATENT DOCUMENTS

| | | | | |
|---|---|---|---|---|
| 5,901,612 | A * | 5/1999 | Letovsky | A47C 1/12 248/661 |
| 6,027,342 | A * | 2/2000 | Brown | G09B 9/14 472/130 |
| 8,827,709 | B1 * | 9/2014 | Gurule | G09B 9/08 434/45 |
| 9,303,421 | B1 * | 4/2016 | Jennings | A63G 31/02 |
| 2004/0029094 | A1 * | 2/2004 | McGraw | G09B 9/00 434/365 |
| 2009/0135133 | A1 * | 5/2009 | Kunzler | A63F 13/245 345/156 |
| 2009/0163283 | A1 * | 6/2009 | Childress | A63F 13/28 463/47 |

* cited by examiner

SEAT APPARATUS HAVING SIMULATED FORCE FEEDBACK AND METHOD FOR SIMULATING FORCE SENSATION OF DRIVING

CROSS-REFERENCE TO RELATED PATENT APPLICATION

This application claims the benefit of priority to U.S. provisional Application No. 63/343512, filed on May 18, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a seat apparatus having a simulated force feedback and a method for simulating a force sensation of driving, and more particularly to a seat apparatus that can provide a force feedback, and a method for simulating a force sensation of driving by using the seat apparatus, which can provide a force feedback corresponding to road conditions to a driver, in which the force feedback is similar to experiencing realistic driving conditions.

BACKGROUND OF THE DISCLOSURE

A vehicle driving simulator, such as a simulation device that can realistically simulate driving actions and sensations, can provide a realistic driving experience to a driver. Various types of vehicle driving simulators are available. A simple vehicle driving simulator only includes a display screen and basic driving control devices, and results in lower realism. An advanced vehicle driving simulator can provide more realistic driving sensations to the driver, but the hardware structure of these simulators is complex, takes up space, and incurs high cost, so that the popularization of these simulators is difficult.

Therefore, how to improve the vehicle driving simulator through an improvement in structural design so as to overcome the above-mentioned deficiencies has become one of the important issues to be addressed in this field.

SUMMARY OF THE DISCLOSURE

In response to the above-referenced technical inadequacy, the present disclosure provides a seat apparatus having a simulated force feedback, in which a seat cushion of the seat apparatus includes a force-sensation simulating mechanism that can provide a forward, rearward, leftward, or rightward force sensation, and has a compact structure to save space.

In addition, in response to the above-referenced technical inadequacy, the present disclosure provides a seat apparatus having a simulated force feedback. The force-sensation simulating mechanism is arranged in a space of chair legs to provide a force sensation of inclining forward or rearward. The mechanism is compact in structural design, and saves space.

In one aspect, the present disclosure provides a seat apparatus having a simulated force feedback. The seat apparatus includes a realistic seat pallet. The realistic seat pallet is disposed on a seat pan, and includes a movable contact cushion and a pallet motive module. The movable contact cushion is configured to be slidable relative to the seat pan, and the pallet motive module is connected to the movable contact cushion. The pallet motive module can control the movable contact cushion to have a leftward or rightward displacement, a forward or rearward displacement, angular displacements, or a yaw rotation.

In one preferred embodiment, the seat apparatus having the simulated force feedback further includes a seating unit and a rotary platform. The seating unit includes the seat pan. The rotary platform includes a chassis and a rotary motive module. The seat pan is disposed on the chassis along a rotation axis in an inclinable manner. The rotary motive module can control the seat pan to have a forward or rearward inclined angle.

In response to the above-referenced technical inadequacy, the present disclosure further provides a method for simulating a force sensation of driving by using the abovementioned seat apparatus having the simulated force feedback. The method can simulate a force sensation of acceleration, deceleration (or braking), turning, climbing, descending, and driving on bumpy road surfaces.

In another aspect, the present disclosure provides a method for simulating a force sensation of driving by using the abovementioned seat apparatus having the simulated force feedback. The method includes steps as follows. Corresponding to an acceleration status, the pallet motive module is driven so that the movable contact cushion is configured to move forward by a predetermined distance that is unable to push forward a body of a driver, so as to simulate a sensation of a speed change during driving.

In one preferred embodiment, the method further includes steps as follows. Corresponding to a deceleration status, the pallet motive module is driven, such that the movable contact cushion is configured to move rearward by another predetermined distance that is unable to move the body of the driver, so as to simulate a sensation of another speed change during driving.

In one preferred embodiment, the method further includes steps as follows. Corresponding to a left turn status, the pallet motive module is driven, such that the movable contact cushion is configured to move leftward by another predetermined distance that is unable to move the body of the driver, so as to simulate a sensation of a centrifugal force.

In one preferred embodiment, the method further includes steps as follows. Corresponding to a right turn status, the pallet motive module is driven, such that the movable contact cushion is configured to move right by another predetermined distance that is unable to move the body of the driver, so to simulate a sensation of a centrifugal force.

In one preferred embodiment, the method further includes steps as follows. Corresponding to a climbing status, the rotary motive module is driven according to a climbing angle, such that the seating unit is configured to be inclined rearward by an elevation angle corresponding to the climbing angle.

In one preferred embodiment, the method further includes steps as follows. Corresponding to a downhill status, the rotary motive module is driven according to a downhill angle, such that the seating unit is configured to be inclined forward by an inclination angle corresponding to the down-hill angle.

In one preferred embodiment, the method further includes steps as follows. Corresponding to a bumpy road, the pallet motive module and the rotary motive module are driven, so that the seat apparatus sways quickly.

Therefore, in the seat apparatus having the simulated force feedback provided by the present disclosure, through the movable contact cushion of the realistic seat pallet, the pallet motive module is configured to control the movable contact cushion to have a leftward or rightward displacement and a forward or rearward displacement, so that the movable contact cushion is slidable relative to the seat pan to provide a force sensation of tilting forward, rearward, leftward, or rightward to a driver. The structural arrangement of the seat apparatus is compact and saves space.

In addition, in the seat apparatus having the simulated force feedback provided by the present disclosure, the rotary platform is arranged in a space of chair legs. By using the rotary motive module to control the seat pan at an inclined angle of forward or rearward, the seat apparatus provides a force sensation of forward or rearward inclination. The structural arrangement of the rotary motive module is compact and saves space.

Furthermore, in the method for simulating a force sensation of driving provided by the present disclosure, the movable contact cushion of the realistic seat pallet and the rotary platform arranged in the space of the chair legs can simulate the force sensation of acceleration, deceleration, turning, climbing, downhill, and bumpy road.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

4

Figure 11:
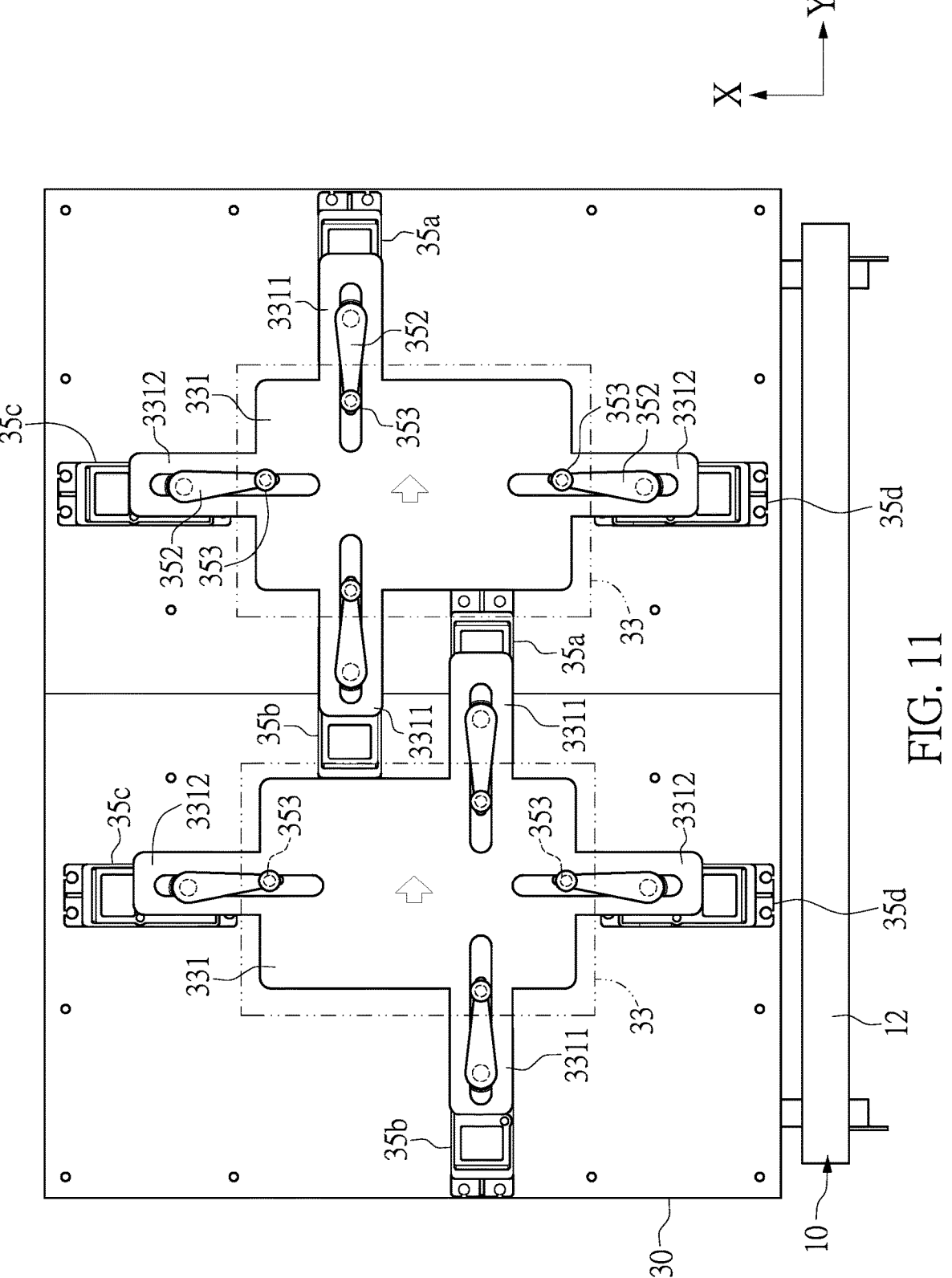
Figure 12:
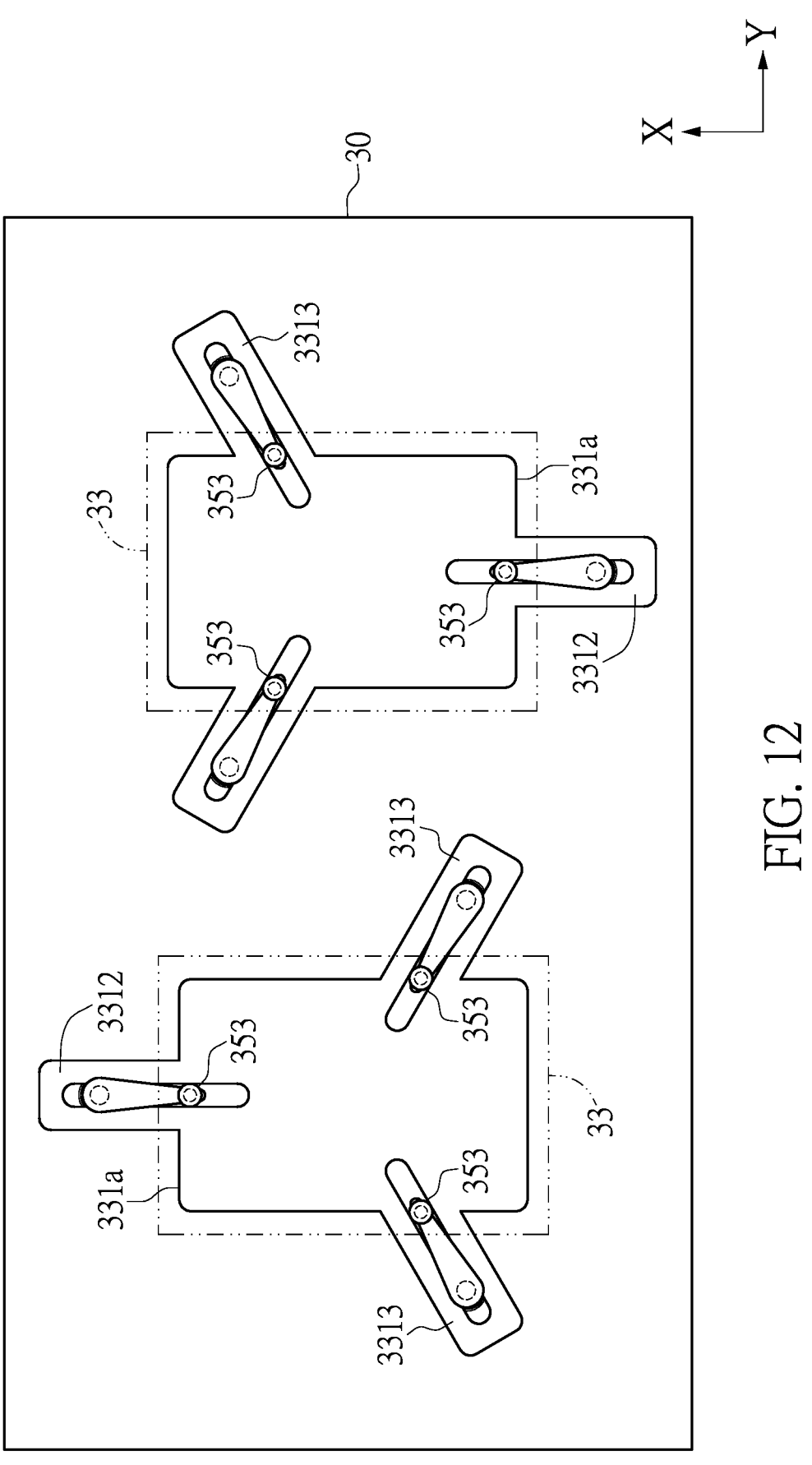

FIG. 11 is a schematic view of the movable contact cushion of the realistic seat pallet according to the present disclosure moving rightward; and FIG. 12 is a top view of the realistic seat pallet according to a second embodiment of the present disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 1:
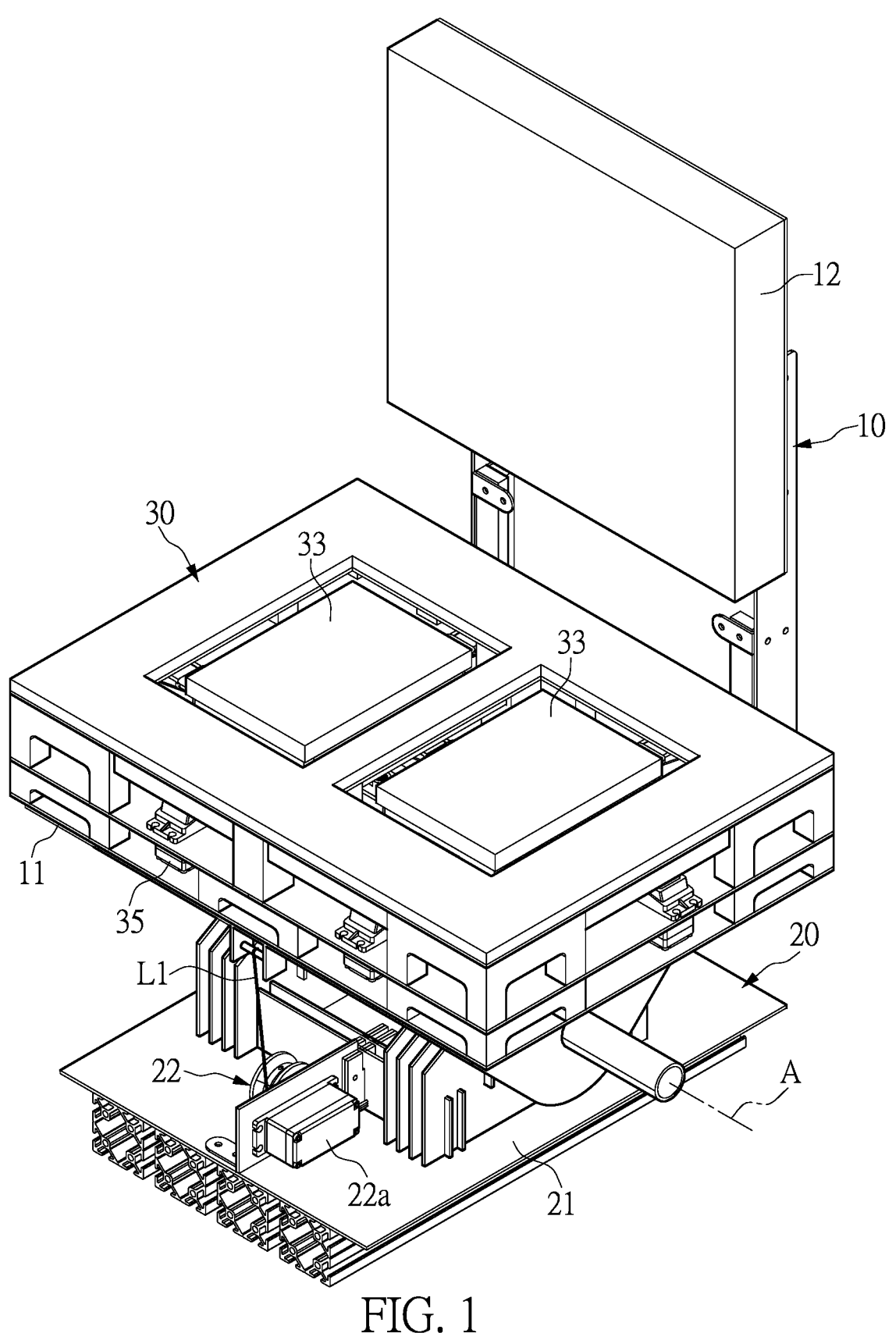
FIG. 1 is an assembled perspective view of a seat apparatus having a simulated force feedback according to the present disclosure.
Figure 2:
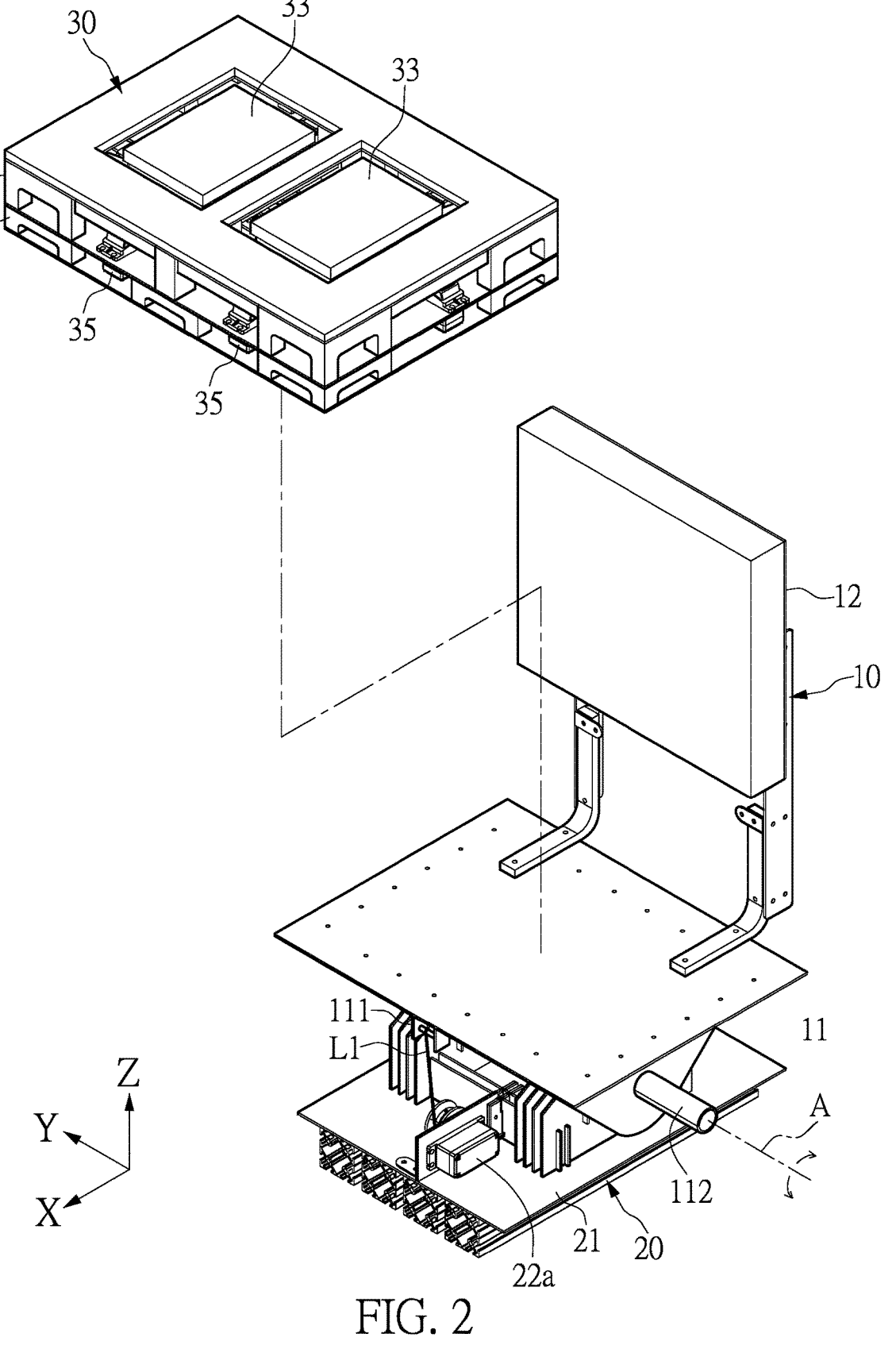
FIG. 2 is an exploded view of the seat apparatus according to the present disclosure.
Figure 3:
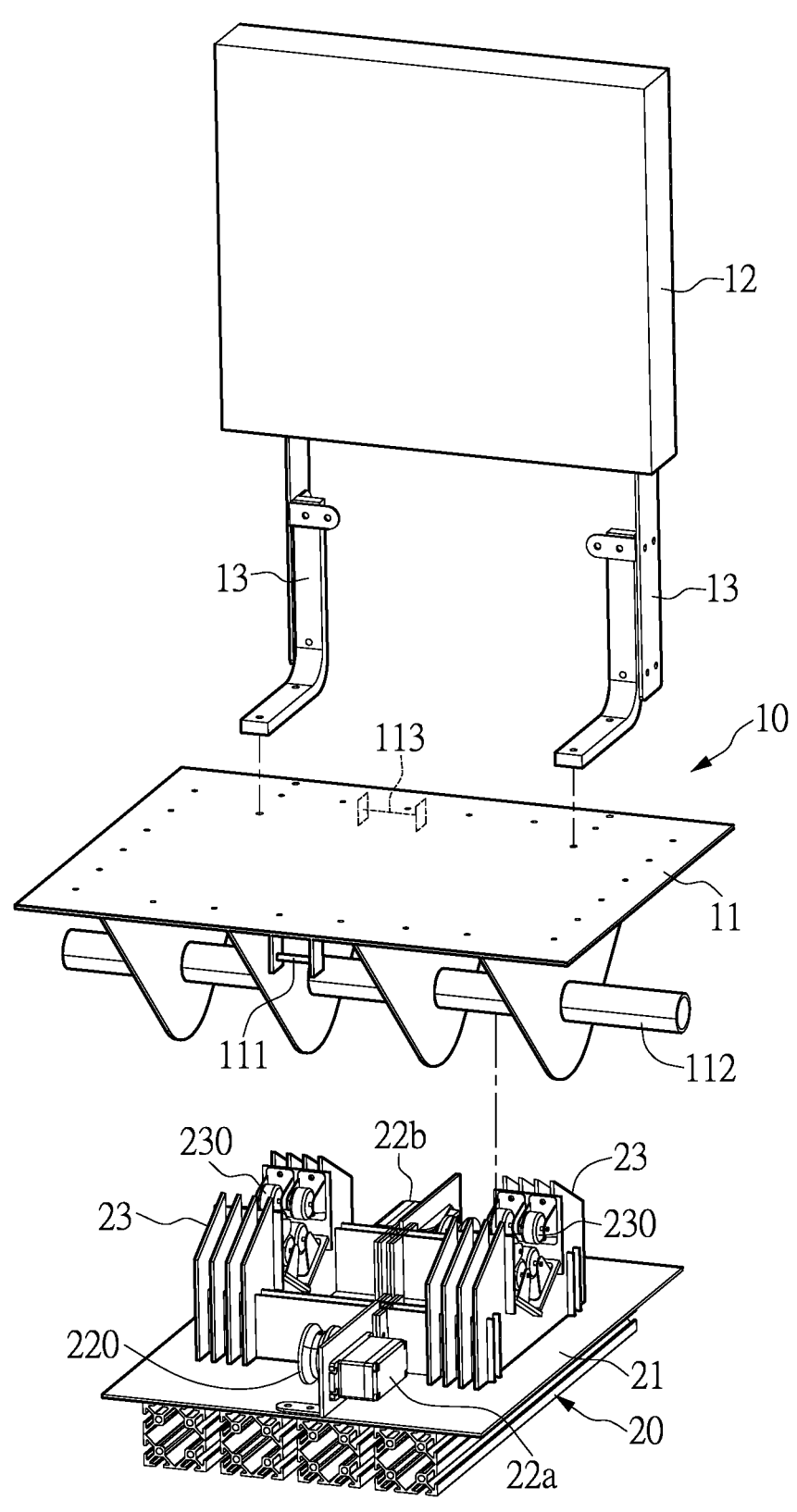
FIG. 3 is an exploded view of a seating unit and a rotary platform according to the present disclosure.

Referring to FIG. 1 to FIG. 3, a first embodiment of the present disclosure provides a seat apparatus having a simulated force feedback. The seat apparatus includes a seating unit 10, a rotary platform 20, and a realistic seat pallet 30. The seating unit 10 includes a seat pan 11 and a backrest 12. The backrest 12 is connected to the seat pan 11. The rotary platform 20 includes a chassis 21 and a rotary motive module 22. The seat pan 11 is disposed on the chassis 21 along a rotation axis A in an inclinable manner. The rotary platform 20 can drive the seat pan 11 by a forward or rearward inclined angle to simulate a forward or rearward inclination status. In this embodiment, the rotary platform 20 is disposed in a space of chair legs.

By the coordinated operation of the rotary platform 20 and the seat pan 11 of this embodiment, one effect of the present disclosure is that the rotary motive module 22 can control the seat pan 11 by a rearward inclined angle corresponding to a simulated climbing road, such as presented in images of a vehicle driving simulator, or a racing game. In addition, the rotary motive module 22 can control the seat pan 11 to have a forward inclined angle corresponding to a simulated downhill road. Therefore, the present disclosure can provide a simulated gravitational force feedback corresponding to a climbing or downhill scenario during a process of driving simulation for a driver.

The realistic seat pallet 30 is disposed on the seat pan 11. The realistic seat pallet 30 includes two movable contact cushions 33 and two pallet motive modules 35. The two movable contact cushions 33 are movable relative to the seat pan 11. Two pallet motive modules 35 correspond to the two movable contact cushions 33, respectively. The two movable contact cushions 33 are configured to correspond to two buttocks of a riderriding person. However, the present disclosure is not limited thereto. The present disclosure can provide one larger movable contact cushion for the rider to seat thereon.

According to the realistic seat pallet 30 of this embodiment, another effect of the present disclosure is that, the pallet motive module 35 can control the movable contact cushion 33 to move leftward or rightward corresponding to a simulated turning status, such as presented in images of a vehicle driving simulator, or a racing game. In addition, the pallet motive module 35 can control the movable contact cushion 33 to move rearward or forward corresponding to a simulated deceleration or acceleration status. Therefore, the present disclosure can provide a force sensation of turning, acceleration, or deceleration of driving to the driver. In this embodiment, the mechanism of simulating the force sensation is arranged in the seat pallet of the chair to provide forward, rearward, leftward, or rightward force sensations. Furthermore, the structural arrangement in this embodiment is compact and saves space.

Components of the present disclosure are described in detail as follows. The backrest 12 of the seating unit 10 is connected to the seat pan 11 via a pair of support brackets 13. The support bracket 13 is substantially L-shaped. However, the present disclosure is not limited thereto, and the backrest 12 can integrally extend upward from the seat pan 11. The seat pan 11 includes an axial rod 112 that is disposed along a direction of the rotation axis A. The axial rod 112 is pivotally connected to the chassis 21 of the rotary platform 20. In detail, the rotary platform 20 includes a pair of supporting stands 23. Each of the supporting stands 23 includes a bearing 230, and the axial rod 112 is rotatably disposed on the bearings 230 of the pair of supporting stands 23. In this embodiment, the bearing 230 includes a plurality of rolling wheels. However, the present disclosure is not limited thereto. For example, the bearing 230 can be a ball bearing.

Figure 4:
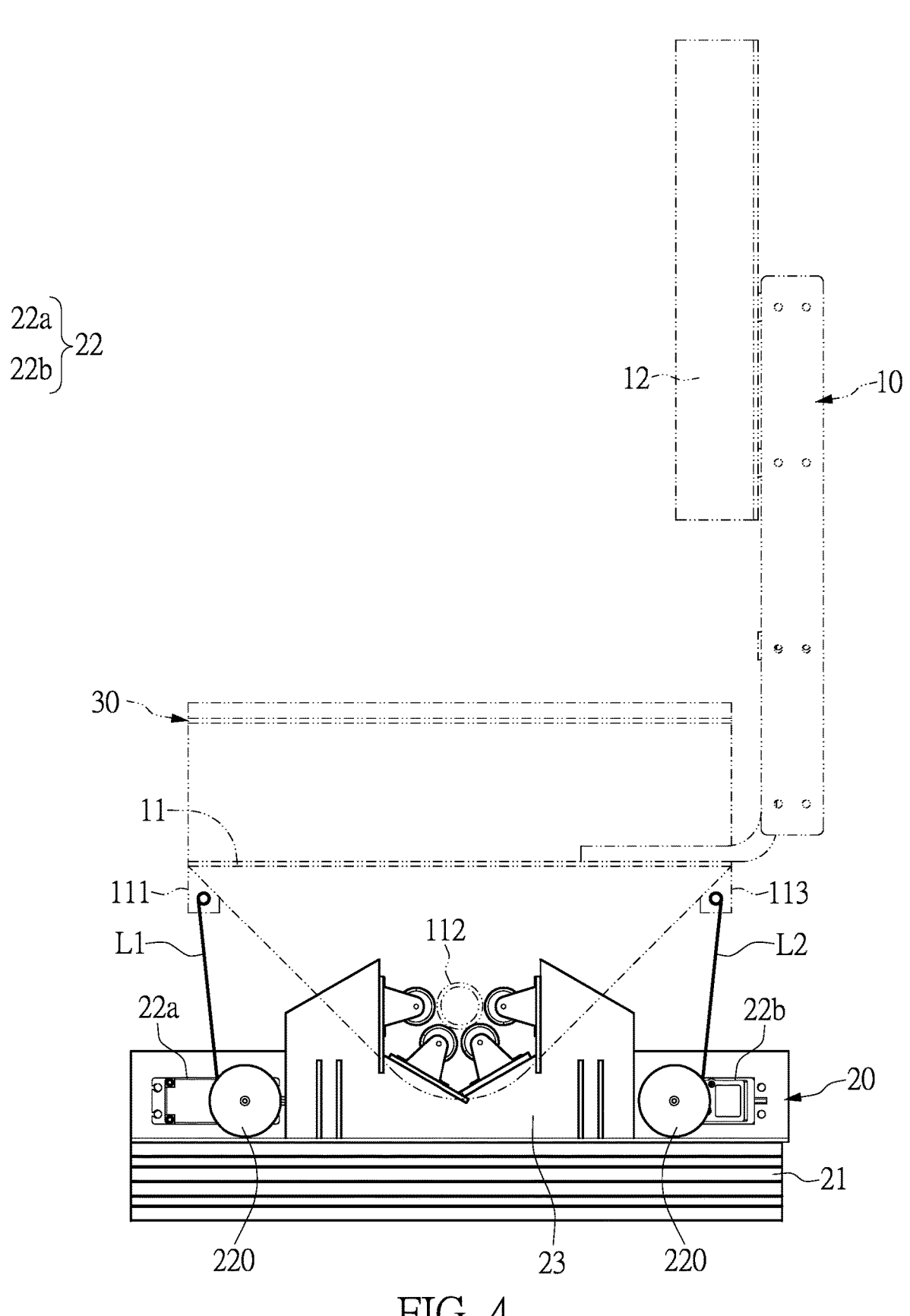
FIG. 4 is a side view of the seat apparatus according to the present disclosure.

Referring to FIG. 3 and FIG. 4, the rotary motive module 22 includes a forward-rotating driving unit 22a, and a rearward-rotating driving unit 22b. In this embodiment, the seating unit 10 is driven by ropes. The rotary platform 20 includes a front rope L1 and a rear rope L2. The forward-rotating driving unit 22a is disposed at a front side of the chassis 21, and the rearward-rotating driving unit 22b is disposed at a rear side of the chassis 21. The front rope L1 is connected to the forward-rotating driving unit 22a and a rope-bonding member 111 at a front end of the seat pan 11. The rear rope L2 is connected to the rearward-rotating driving unit 22b and another rope-bonding member 113 at a rear end of the seat pan 11. In detail, each of the forward-rotating driving unit 22a and the rearward-rotating driving unit 22b includes a rope pulley 220, and the front rope L1 and the rear rope L2 are wound around on the rope pulley 220. However, the present disclosure is not limited thereto, and the forward-rotating driving unit 22a and the rearward-rotating driving unit 22b can use a gear set, a connecting rod, a pneumatic cylinder or a hydraulic cylinder to exert force to the front end or the rear end of the seat pan 11 to drive the seating unit 10 to be inclined forward or rearward.

Figure 5:
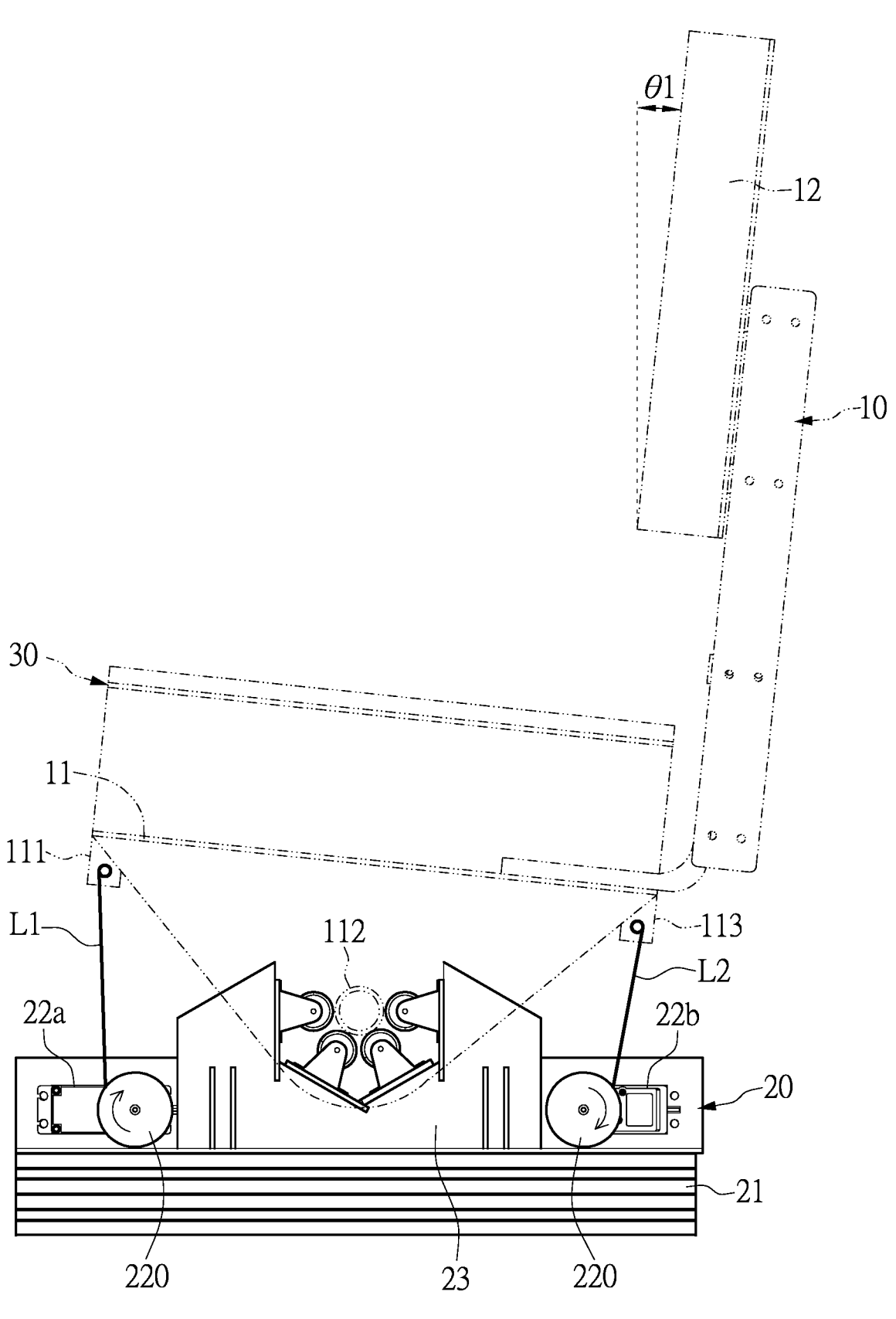
FIG. 5 is a side view of the seat apparatus according to the present disclosure inclining rearward.

As shown in FIG. 5, when the rearward-rotating driving unit 22b pulls the rear rope L2 downward, the seating unit 10 can be inclined rearward. Such status can simulate a scenario of driving on the climbing road. An inclined angle θ1 of the seating unit 10 can correspond to the climbing angle, so that an operator of the system can have realistic sensation similar to that of an actual road condition. The climbing angle can be obtained by transferring a relative variable factor that is captured via computer software, and then treated as a driving scale of the rearward-rotating driving unit 22b.

Figure 6:
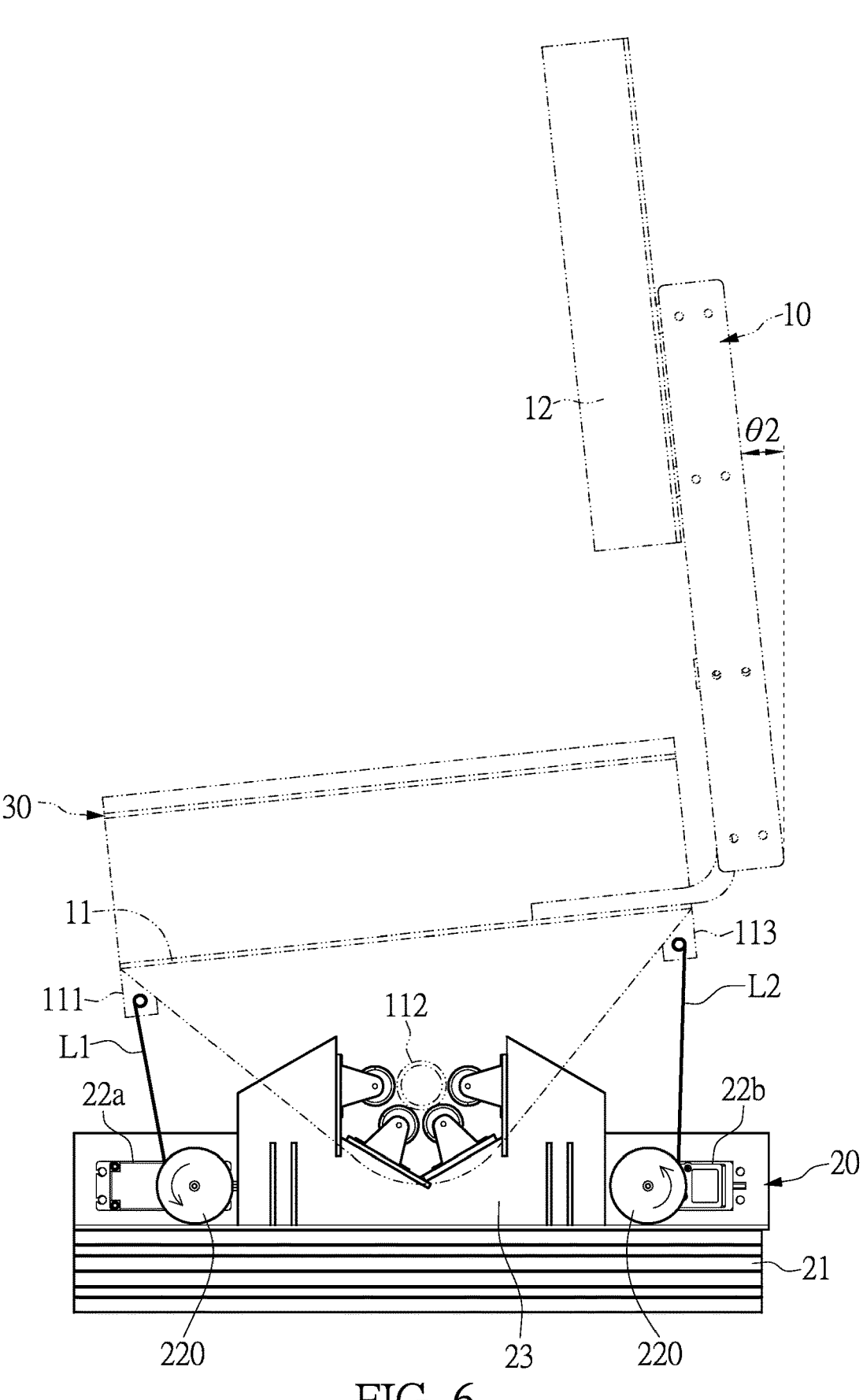
FIG. 6 is a side view of the seat apparatus according to the present disclosure inclining forward.

As shown in FIG. 6, when the forward-rotating driving unit 22a pulls the front rope L1 downward, the seating unit 10 can be inclined forward. Such an arrangement can simulate a scenario of driving on a downhill road. An inclined angle θ2 of the seating unit 10 can correspond to the downhill angle, so that the operator of the system can have realistic sensation similar to that of an actual road condition. The downhill angle can be obtained by transferring a relative variable factor that is captured via computer software, and then treated as a driving scale of the forward-rotating driving unit 22a.

Figure 7:
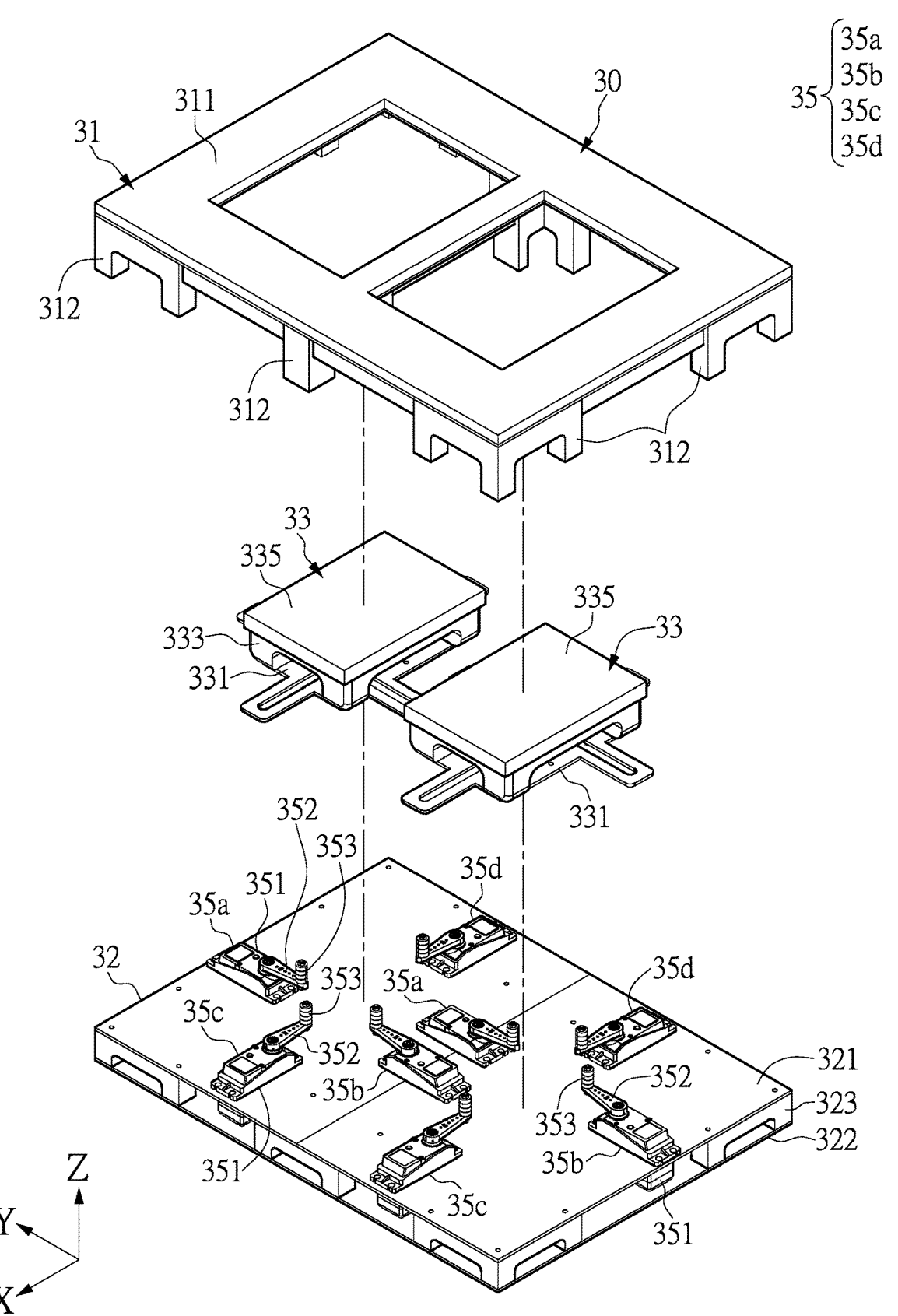
FIG. 7 is an exploded perspective view of a realistic seat pallet according to the present disclosure.

As shown in FIG. 7, the realistic seat pallet 30 includes an upper frame 31 and a lower frame 32. The upper frame 31 is disposed on the lower frame 32. The movable contact cushion 33 is movably disposed on a top surface of the lower frame 32 and is exposed from the upper frame 31. The pallet motive module 35 is disposed on the lower frame 32. Such an arrangement has an advantage that the weight of the operator does not affect the pallet motive module 35.

Figure 8:
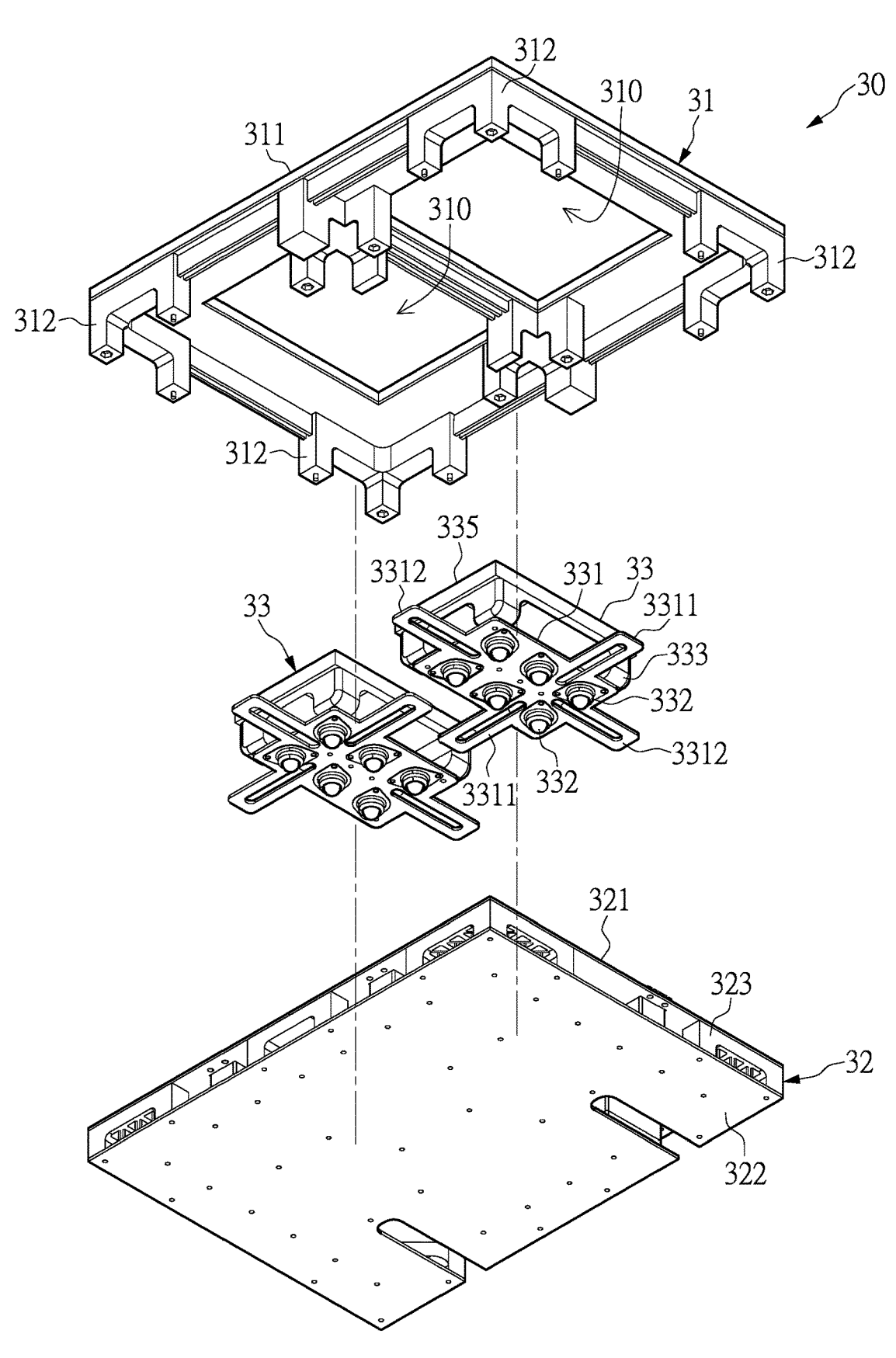
FIG. 8 is another exploded perspective view of the realistic seat pallet according to the present disclosure.

In detail, the upper frame 31 includes a top board 311 and a plurality of upper supporting members 312. As shown in FIG. 8, the top board 311 has two openings 310 formed thereon. The upper supporting member 312 is connected to a bottom surface of the top board 311, so as to provide a space for receiving the realistic seat pallet 30. The lower frame 32 includes a middle board 321, a lower board 322, and a plurality of lower supporting members 323. The lower supporting members 323 are disposed between the middle board 321 and the lower board 322 for forming a receiving space to receive the pallet motive module 35. The middle board 321 functions as a top surface of the lower frame 32. The movable contact cushion 33 is movably abutted against the middle board 321.

In detail, in this embodiment, the realistic seat pallet 30 includes two movable contact cushions 33 and two pallet motive modules 35. The upper frame 31 has two openings 310. The two movable contact cushions 33 are disposed in the openings 310, respectively. An area of the opening 310 is larger than an area of the movable contact cushion 33. The movable contact cushion 33 is movable in the opening 310. However, the present disclosure is not limited thereto. The quantity of the opening can be at least one, and the opening correspondingly receives at least one movable contact cushion 33 therein.

Referring to FIG. 7 and FIG. 8, each of the movable contact cushions 33 includes a driving plate 331, a plurality of rolling elements 332, an elevated frame 333, and a soft pad 335. The rolling elements 332 are disposed on a bottom surface of the driving plate 331 and slidably contact the top surface of the lower frame 32. The rolling elements 332 of this embodiment are ball transfer units (as shown in FIG. 8), that can freely roll in different directions. The elevated frame 333 is disposed on a top surface of the driving plate 331. The soft pad 335 is disposed on a top surface of the elevated frame 333. The driving plate 331 includes a plurality of rails (3311, 3312). The pallet motive module 35 can drive the rails (3311, 3312) so as to drive the driving plate 331 to move the movable contact cushion 33.

Figure 9:
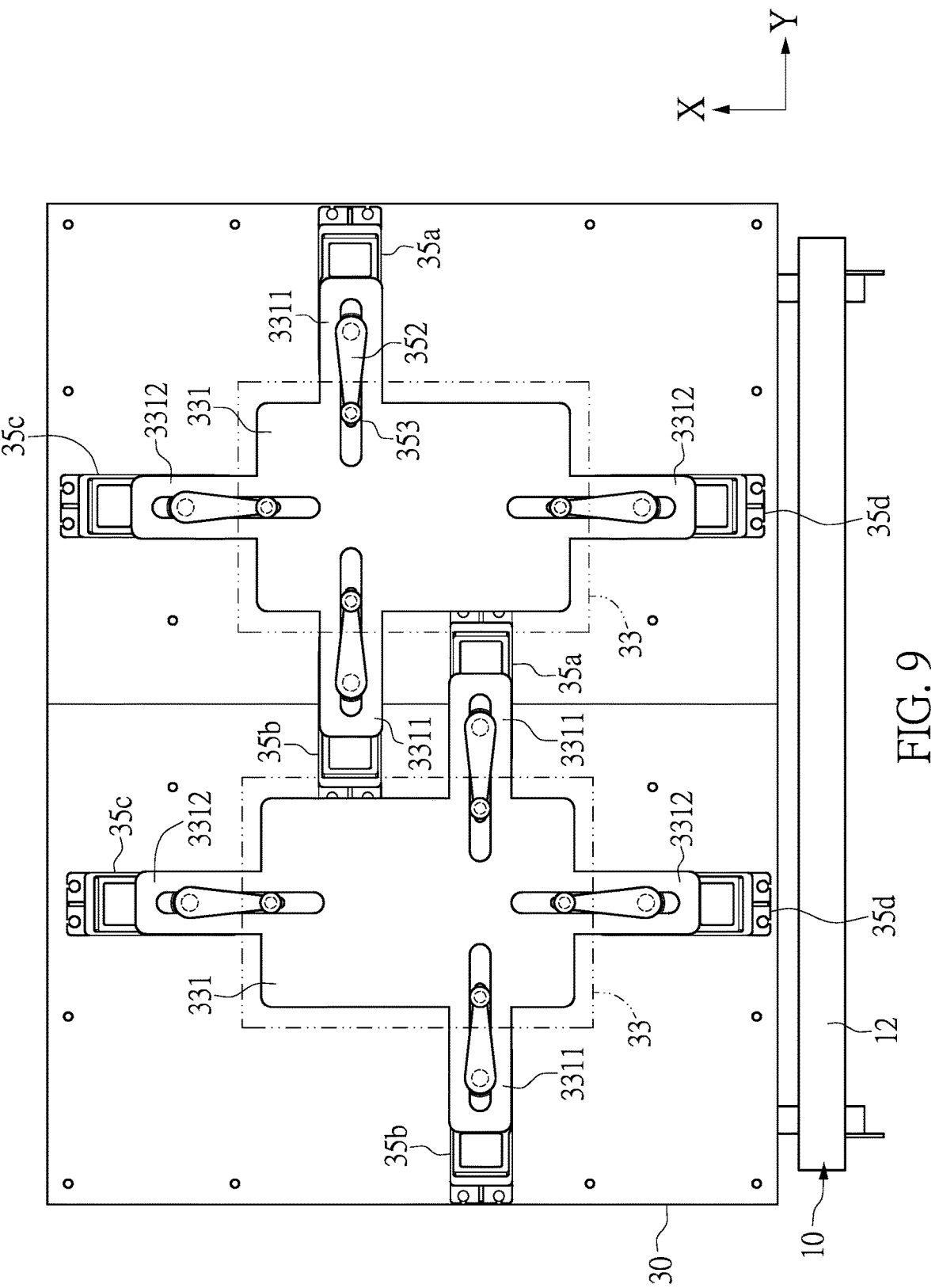
FIG. 9 is a top view of the realistic seat pallet according to the present disclosure.

Referring to FIG. 7 to FIG. 9, in detail, the driving plate 331 includes a pair of first rails 3311 and a pair of second rails 3312. The pair of first rails 3311 protrude outward from two opposite sides of the driving plate 331, respectively. The pair of second rails 3312 are perpendicular to the pair of first rails 3311. The pair of second rails 3312 protrude outward from another two opposite sides of the driving plate 331, respectively. In this embodiment, the first rails 3311 are perpendicular to the second rails 3312.

Referring to FIG. 7 to FIG. 9, each of the pallet motive modules 35 includes a first pair of pallet driving units 35*a*, 35*b* to provide a power in front and rear directions, and a second pair of pallet driving units 35*c*, 35*d* to provide a power in left and right directions. The first pair of pallet driving units 35*a*, 35*b* are connected to the pair of first rails 3311, respectively. The second pair of pallet driving units 35*c*, 35*d* are connected to the pair of second rails 3312, respectively. Each of the pallet driving units (35*a*, 35*b*, 35*c*, 35*d*) includes a servo motor 351 (referring to FIG. 7, a part of the servo motor 351 is located in the lower frame 32), a rotary arm 352, and a guide post 353. One end of the rotary arm 352 is rotatably connected to the servo motor 351, and another end of the rotary arm 352 is connected to the guide post 353. The guide post 353 is connected to one of the first rails 3311 or one of the second rails 3312. However, the present disclosure is not limited thereto, and the pallet driving unit can drive the movable contact cushion by using a gear set.

Figure 10:
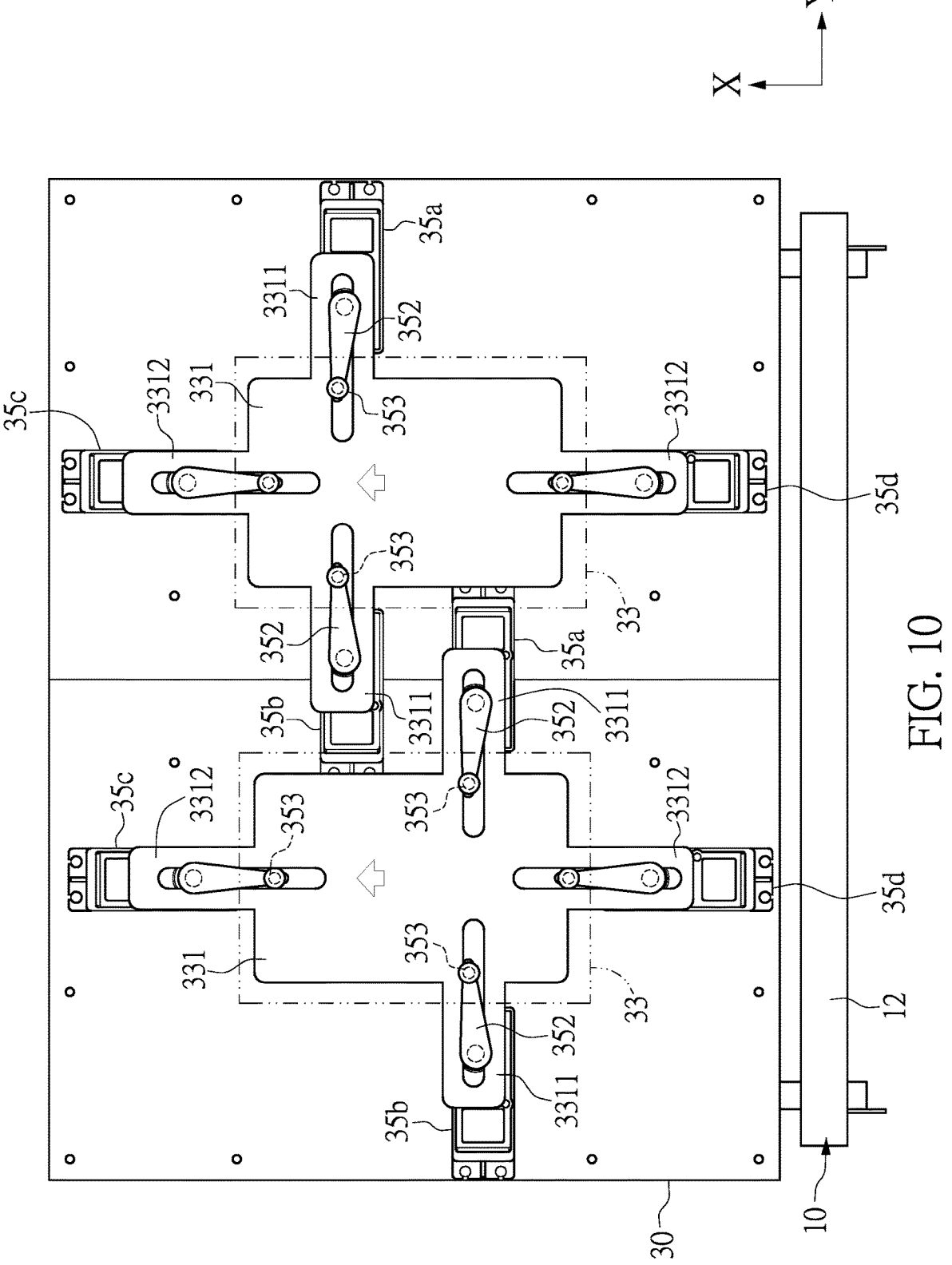
FIG. 10 is a schematic view of a movable contact cushion of the realistic seat pallet according to the present disclosure moving forward.

The present disclosure further provides a method for simulation as follows. However, the below details are disclosed for exemplary purposes only, and are not meant to limit the scope of the present disclosure. As shown in FIG. 10, this embodiment can simulate an acceleration status. The rotary arms 352 of the first pair of pallet driving units 35*a*, 35*b* can swing forward, that is, in a positive X-axis direction as shown in FIG. 10. Therefore, the guide posts 353 of the first pair of pallet driving units 35*a*, 35*b* respectively push the first rails 3311 forward. At this time, the second pair of the pallet driving units 35*c*, 35*d* do not operate. The second rail 3312 does not receive any force and is only brought to move forward in the X-axis direction. Therefore, the movable contact cushion 33 is brought to move forward by the pallet motive module 35. It should be noted that, a displacement amount of the first rail 3311 that equals to a forward displacement amount of the movable contact cushion 33, is a small displacement amount that does not move a body of a driver. At this time, the body of the driver is moved rearward relative to the buttocks. In other words, the center of mass of the rider is located above the buttocks, and the buttocks are forced to be moved by the above-mentioned small forward displacement amount through the movable contact cushion 33. Such an arrangement simulates a friction force exerted on the buttocks caused by acceleration, and the body of the rider is slightly bent backwards relative to the center of mass. The above-mentioned can correspond to an acceleration status, such as presented in images of a vehicle driving simulator, a racing game, or an action scene of a movie. The pallet motive module 35 can drive the movable contact cushion 33 to move forward, so as to provide a force sensation of acceleration during riding to the rider. However, the present disclosure is not limited thereto. The abovementioned small forward displacement amount can save energy for the pallet driving unit, and can be within 5 cm. Alternatively, if the displacement amount of the movable contact cushion 33 is a distance that forces the body to move, the acceleration status can be simulated by driving the movable contact cushion 33 to move rearward, and the body together with buttocks move rearward.

Similarly, the embodiment also can simulate a deceleration status. Figures for the following descriptions are omitted in the present disclosure. When the rotary arms 352 of the first pair of pallet driving units 35*a*, 35*b* swing rearward in a negative X-axis direction as shown in FIG. 10, the guide posts 353 of the first pair of pallet driving units 35*a*, 35*b* push the first rails 3311 to move rearward by a small amount of distance that does not move that body of the driver. At this time, the body of the driver is inclined rearward relative to the buttocks. Further, the movable contact cushion 33 is driven by the pallet motive module 35 to move rearward. When the buttocks are brought to move by the small rearward displacement amount by the movable contact cushion 33, an upper body of the driver is slightly inclined forward relative to the center of mass to simulate the friction force exerted on the buttocks as deceleration, because the center of mass of the upper body of the driver is located above the buttocks. Therefore, the abovementioned embodiment can correspond to a deceleration status, such as in a driving screen of a game. By driving the pallet motive module 35, the movable contact cushion 33 moves rearward, so as to provide a force sensation of deceleration of driving to the driver. However, the present disclosure is not limited thereto. The above-mentioned small displacement amount can save the energy of the pallet driving unit. For example, if a displacement amount of the movable contact cushion 33 is a distance large enough that forces the body of the driver to move, the upper body and the buttocks being inclined forward together also simulates a deceleration status.

As shown in FIG. 11, this embodiment can simulate a right turn status. In this scenario, the rotary arms 352 of the second pair of pallet driving units 35*c*, 35*d* swing rightward, that is, along a positive Y-axis direction as shown in FIG. 11. Meanwhile, the guide posts 353 of the second pair of pallet driving units 35*c*, 35*d* push the second rail 3312 to move rightward. At the same time, the first pair of pallet driving units 35*a*, 35*b* do not actively move, and the first rails 3311 do not receive any force and are passively brought to be moved rightward in the positive Y-axis direction. Therefore, by the pallet motive module 35, the movable contact cushion 33 is driven to move rightward by a small amount of distance that does not move the body of the driver. Then, the body of the driver is inclined leftward relative to the hips. In other words, when the buttocks are brought to move rightward by a small amount of distance by the movable contact cushion 33, the body of the driver is slightly inclined leftward along the center of mass relative to the buttocks to simulate a centrifugal force of performing a right turn because the center of mass of the upper body of the driver is located above the buttocks. The abovementioned embodiment can correspond to a right turn status. For example, in a driving screen of a game, the pallet motive module 35 is driven so that the movable contact cushion 33 moves rightward, so as to provide a sensation of centrifugal force similar to performing a right turn during driving to the driver. However, the present disclosure is not limited thereto. For example, if the displacement amount of the movable contact cushion 33 is large enough to move the body of the driver, the movable contact cushion 33 moving leftward at such a level that the upper body and the buttocks are inclined leftward together can also simulate a right turn status.

Similarly, the embodiment also can simulate a left turn status. Figures for the following descriptions are omitted in the present disclosure. When the rotary arms 352 of the second pair of pallet driving units 35c, 35d swing left in a negative Y-axis direction as shown in FIG. 11, the guide posts 353 of the second pair of pallet driving units 35c, 35d push the second rails 3312 to move leftward. At this time, the first pair of pallet driving units 35a, 35b do not actively move, and the first rails 3311 do not receive any force and are passively brought to be moved leftward in the negative Y-axis direction. Therefore, by the pallet motive module 35, the movable contact cushion 33 is driven to move leftward by a small amount of distance that does move the body of the driver. The body of the driver is inclined rightward relative to the buttocks. In other words, when the buttocks are brought to move leftward by a small amount of distance by the movable contact cushion 33, the body of the driver is slightly inclined rightward along the center of mass relative to the buttocks to simulate a centrifugal force of performing a left turn because the center of mass of the upper body of the driver is located above the buttocks. For example, in a driving screen of a game, the pallet motive module 35 is driven so that the movable contact cushion 33 moves leftward, so as to provide a sensation of centrifugal force similar to performing a left turn during driving to the driver. However, the present disclosure is not limited thereto. For example, if the displacement amount of the movable contact cushion 33 is large enough to move the body of the driver, the movable contact cushion 33 moving rightward at such a level that the upper body and the buttocks are inclined rightward together can also simulate a left turn status.

The abovementioned two movable contact cushions 33 are driven to move in the same direction. However, the present disclosure is not limited thereto. The two movable contact cushions 33 can move in different directions. For example, one movable contact cushion 33 moves forward, and the other movable contact cushion 33 moves rearward. Then, the two movable contact cushions 33 move in opposite directions instantaneously to form a quick front and rear sway. Alternatively, the two movable contact cushions 33 simultaneously move leftward quickly, and then simultaneously move rightward quickly, so as to form a quick sway sideways. Therefore, the sway of the two movable contact cushions 30 can provide a sensation of a bumpy road while driving to the driver. However, the present disclosure is not limited to moving back and forth (in 90 degrees) or sideways (in 0 degrees). For example, the pallet driving units 35a, 35b, 35c, and 35d can be controlled to rotate at different angles, so that the movable contact cushions 33 can move at different angles, such as 45 degrees, or 30 degrees. Such a manner also can provide a sensation of a bumpy road while driving to the driver. However, the present disclosure is not limited to having four power sources. The present disclosure can provide three power sources that are separate by an included angle of 120 degrees to control the movable contact cushions 33 to move in different angles. Alternatively, a quantity of the power sources can be five or more.

Second Embodiment

Referring to FIG. 12, FIG. 12 is a top view of the movable contact cushion of the realistic seat pallet according to a second embodiment of the present disclosure. In this embodiment, the realistic seat pallet 30 has two movable contact cushions 33. Each movable contact cushion 33 includes a driving plate 331a. Each driving plate 331a includes three rails that are a vertical second rail 3312 and two oblique rails 3313 that are separate by an included angle of 120 degrees. According to this embodiment, the realistic seat pallet 30 can include three pallet driving units (that are omitted in this figure, and can be referred to the guide posts 353), thereby controlling the movable contact cushion 33 to move in different angles.

The present disclosure provides a method for simulating a force sensation of driving by using the above-mentioned seat apparatus having the simulated force feedback. The method includes at least steps as follows.

Corresponding to an acceleration status, the pallet motive module 35 is driven, and the movable contact cushion is configured to move forward by a small amount of distance that is unable to push forward a body of a driver, so as to simulate a sensation of a speed change during driving. At this time, the body of the driver is inclined rearward relative to the buttocks, and the driver feels a corresponding acting force, so that a condition acted on the driver because of an effect of inertia can be simulated.

Corresponding to a deceleration status, the pallet motive module 35 is driven, and the movable contact cushion is configured to move rearward a small amount of distance that is unable to push forward a body of the driver, so as to simulate a sensation of a speed change during driving. At this time, the body of the driver is inclined forward relative to the buttocks, and the driver feels a corresponding acting force, so that a condition acted on the driver because of an effect of inertia can be simulated.

Corresponding to a left turn status, the pallet motive module 35 is driven, and the movable contact cushion is configured to move leftward by a small amount of distance that is unable to move the body of the driver, so as to simulate a sensation of a centrifugal force. At this time, the body of the driver is inclined rightward relative to the buttocks, and the driver feels a corresponding acting force, so that a sensation of speed change from performing a turn while driving can be simulated.

Corresponding to a right turn status, the pallet motive module 35 is driven, and the movable contact cushion is configured to move right by a small amount distance that is unable to move a body of the driver, so as to simulate a sensation of a centrifugal force. At this time, the body of the driver is inclined leftward relative to the buttocks, and feels a corresponding acting force, so that a sensation of speed change from performing a turn while driving can be simulated.

Corresponding to a climbing status, the rotary motive module 22 is driven according to a climbing angle, such that the seating unit 10 is configured to be inclined rearward by an elevation angle corresponding to the climbing angle. For example, a driving screen of a game has a climbing angle of 15 degrees, and the seating unit 10 is inclined rearward by 15 degrees. Therefore, the driver can feel an acting force of rearward inclination similar to that of climbing while driving.

Corresponding to a downhill status, the rotary motive module 22 is driven according to a downhill angle, such that the seating unit 10 is configured to be inclined forward by an inclination angle corresponding to the downhill angle. For example, a driving screen of a game has a downhill angle of 30 degrees, and the seating unit 10 is inclined forward by 30 degrees. Therefore, the driver can feel an acting force of forward inclination similar to that of downhill while driving.

In addition, in the present disclosure, corresponding to a bumpy road, the pallet motive module 35 can be driven, so that the movable contact cushion 33 sways quickly from side to side. Alternatively, the two movable contact cushions 33 can be respectively driven to move forward and rearward.

Beneficial Effects of the Embodiments

In conclusion, in the seat apparatus having the simulated force feedback provided by the present disclosure, through the movable contact cushion of the realistic seat pallet, the pallet motive module is configured to control the movable contact cushion to have a leftward or rightward displacement and a forward or rearward displacement, so that the movable contact cushion is slidable relative to the seat pan to provide a force sensation of tilting forward, rearward, leftward or rightward to a driver. The structural arrangement of the seat apparatus is compact and saves space.

In addition, in the seat apparatus having the simulated force feedback provided by the present disclosure, the rotary platform is arranged in a space of chair legs. By using the rotary motive module to control the seat pan at an inclined angle of forward or rearward, the seat apparatus provides a force sensation of forward or rearward inclination. The structural arrangement is compact and saves space.

Further, in the method for simulating a force sensation of driving provided by the present disclosure, the movable contact cushion of the realistic seat pallet and the rotary platform arranged in the space of the chair legs can simulate the force sensation of acceleration, deceleration, turning, climbing, downhill and bumpy road.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A seat apparatus having a simulated force feedback, comprising:
   a realistic seat pallet disposed on a seat pan, wherein the realistic seat pallet includes a movable contact cushion and a pallet motive module, the movable contact cushion is configured to be slidable relative to the seat pan, the pallet motive module is connected to the movable contact cushion, and the pallet motive module is capable of controlling the movable contact cushion to have a leftward or rightward displacement, a forward or rearward displacement, angular displacements, or a yaw rotation;
   wherein the realistic seat pallet includes an upper frame and a lower frame, the upper frame is disposed on the lower frame, the movable contact cushion is movably disposed on a top surface of the lower frame and is exposed from the upper frame, and the pallet motive module is disposed on the lower frame;
   wherein the upper frame has an opening, and the movable contact cushion is disposed in the opening.

2. The seat apparatus according to claim 1, further comprising a seating unit and a rotary platform, wherein the seating unit includes the seat pan, the rotary platform includes a chassis and a rotary motive module, the seat pan is disposed on the chassis along a rotation axis in an inclinable manner, and the rotary motive module is capable of controlling the seat pan to have a forward or rearward inclined angle.

3. The seat apparatus according to claim 2, wherein the seating unit further includes a backrest, the backrest is connected to the seat pan, the seat pan includes an axial rod disposed along a direction of the rotation axis, and the axial rod is pivotally connected to the chassis of the rotary platform.

4. The seat apparatus according to claim 3, wherein the rotary platform includes two supporting stands, each of the supporting stands includes a bearing, and the axial rod is rotatably disposed on the bearings of the two supporting stands.

5. The seat apparatus according to claim 4, wherein the rotary motive module includes a forward-rotating driving unit and a rearward-rotating driving unit, the forward-rotating driving unit is disposed at a front side of the chassis, and the rearward-rotating driving unit is disposed at a rear side of the chassis; wherein the forward-rotating driving unit exerts a force on a front end of the seat pan, and the rearward-rotating driving unit exerts a force on a rear end of the seat pan.

6. The seat apparatus according to claim 1, wherein the realistic seat pallet includes two of the movable contact cushions and two of the pallet motive modules, the upper frame has two of the openings, and the two movable contact cushions are disposed in the two openings, respectively.

7. The seat apparatus according to claim 1, wherein each of the movable contact cushions includes a driving plate, a plurality of rolling elements, an elevated frame, and a soft pad; wherein the plurality of rolling elements are disposed on a bottom surface of the driving plate and slidably contact the top surface of the lower frame, the elevated frame is disposed on a top surface of the driving plate, and the soft pad is disposed on a top surface of the elevated frame; wherein the driving plate includes a plurality of rails, and the pallet motive module includes a plurality of pallet driving units to respectively drive the rails, so as to drive the driving plate to move the movable contact cushion.

8. The seat apparatus according to claim 7, wherein the driving plate includes three of the rails being separate from each other by an included angle of 120 degrees, and the pallet motive module includes three of the pallet driving units respectively to drive the three rails, so as to drive the driving plate to move the movable contact cushion.

9. The seat apparatus according to claim 7, wherein the driving plate includes two first rails and two second rails, the two first rails protrude outward from two opposite sides of the driving plate, respectively, the two second rails are perpendicular to the two first rails, and the two second rails protrude outward from another two opposite sides of the driving plate, respectively.

10. The seat apparatus according to claim 9, wherein each of the pallet motive modules includes a first pair of pallet driving units to provide a power in front and rear directions, and a second pair of pallet driving units to provide a power in left and right directions, the first pair of pallet driving units are respectively connected to the pair of first rails, and the second pair of pallet driving units are respectively connected to the pair of second rails; wherein each of the pallet driving units includes a servo motor, a rotary arm, and a guide post, one end of the rotary arm is rotatably connected to the servo motor, another end of the rotary arm is connected to the guide post, and the guide post is connected to one of the pair of first rails or one of the pair of second rails.

11. The seat apparatus according to claim 6, wherein one of the two movable contact cushions moves forward, and another one of the two movable contact cushions moves rearward.

12. A method for simulating a force sensation of driving by using the seat apparatus as claimed in claim 1, comprising:

corresponding to an acceleration status, driving the pallet motive module so that the movable contact cushion is configured to move forward by a predetermined distance that is unable to push forward a body of a driver, so as to simulate a sensation of a speed change during driving.

13. The method of claim 12, further comprising:

corresponding to a deceleration status, driving the pallet motive module, such that the movable contact cushion is configured to move rearward by another predetermined distance that is unable to move the body of the driver, so as to simulate a sensation of another speed change during driving.

14. The method of claim 12, further comprising:

corresponding to a left turn status, driving the pallet motive module, such that the movable contact cushion is configured to move leftward by another predetermined distance that is unable to move the body of the driver, so as to simulate a sensation of a centrifugal force.

15. The method of claim 12, further comprising:

corresponding to a right turn status, driving the pallet motive module, such that the movable contact cushion is configured to move rightward by another predetermined distance that is unable to move the body of the driver, so as to simulate a sensation of a centrifugal force.

16. The method of claim 12, further comprising:

corresponding to a climbing status, driving the rotary motive module according to a climbing angle, such that the seating unit is configured to be inclined rearward by an elevation angle corresponding to the climbing angle.

17. The method of claim 12, further comprising:

corresponding to a downhill status, driving the rotary motive module according to a downhill angle, such that the seating unit is configured to be inclined forward by an inclination angle corresponding to the downhill angle.

18. The method of claim 12, further comprising:

corresponding to a bumpy road, driving the pallet motive module and the rotary motive module, so that the seat apparatus sways quickly.

* * * * *